I. H. WANZER.
MILK-COOLER.
No. 171,251. Patented Dec. 21, 1875.
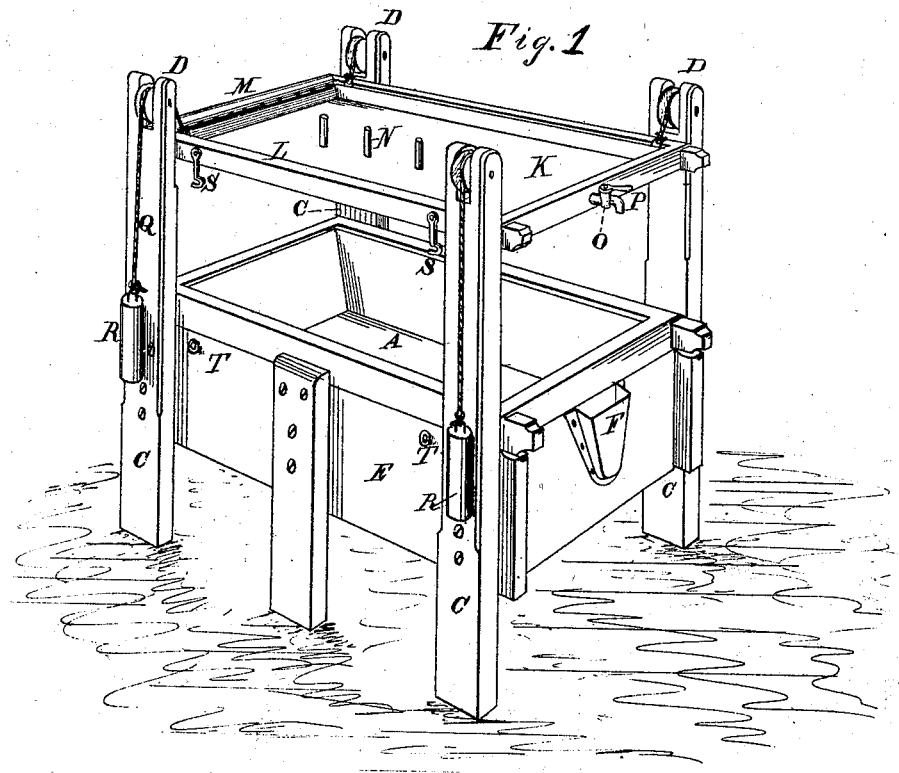
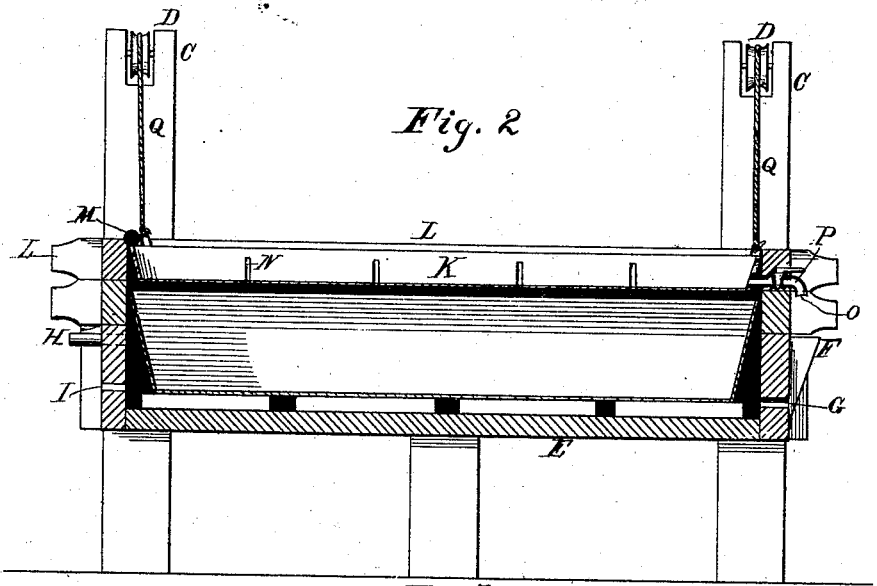
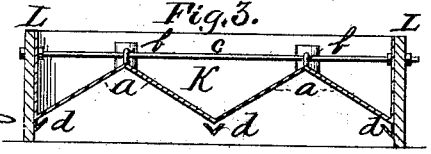
WITNESSES
Grenville Lewis
M. Church
INVENTOR
Isaac H. Wanzer
By Hill & Elsworth
His ATTORNEYS

UNITED STATES PATENT OFFICE.

ISAAC H. WANZER, OF ELGIN, ILLINOIS.

IMPROVEMENT IN MILK-COOLERS.

Specification forming part of Letters Patent No. 171,251, dated December 21, 1875; application filed June 9, 1875.

*To all whom it may concern:*

Be it known that I, ISAAC H. WANZER, of Elgin, in the county of Kane and State of Illinois, have invented a new and Improved Milk-Cooler; and I do hereby declare the following to be a full and exact description of the same, reference being had to the accompanying drawings forming part of this specification, in which—

Figure 1 is a perspective view of the invention, showing the cooling-pan elevated. Fig. 2 is a vertical longitudinal sectional view, showing the several parts in place for the operation of cooling the milk; and Fig. 3 represents a modification of the pan K.

Similar letters of reference in the accompanying drawings denote the same parts.

It has been the custom heretofore in dairies and cheese manufactories to cool the milk by placing it in tin pails and running water around them, which has been open to objection in two ways—first, the danger of breaking the bales in lifting the pails out, and spilling the milk; and, secondly, owing to the large amount of surface presented for the adhesion of the cream—the waste by this last means alone amounting to a large item. It has also been customary to place the milk in vats, and to run cold water around the outside of the vat, the water being introduced at one end, passed around the sides, and out at the other end, in consequence of which the warmest portion of the water arose to the top on the outside of the vat, and the cream to the top within the vat, which action caused the cream to become soured from six to ten hours sooner than the milk, necessitating the performance of the operation of skimming the milk before all the cream was secured. The tin pails placed in a vat supplied with running water are open to this latter objection, as well as to the objections above noted, and the milk in both instances is permitted to absorb any noxious vapor or impure air that may be generated in the room or wherever it is placed to cool.

This invention has for its object the production of a milk-cooler that will not be open to any of the objections above noted, and one that will cool the milk from the top as well as at the sides of the cooler; and to these ends it consists of a metallic cooling pan or vat, provided with a perforated pipe at one end, one or more ventilators in its bottom, and a discharge-pipe, provided with a stop-cock, at the other end, in combination with a milk or cheese vat surrounded by a water-space, having an inlet-pipe, an overflow-pipe, and a pipe through which the water may be wholly withdrawn from said water-space, said cooling pan or vat being suspended, or otherwise arranged above the milk or cheese vat to form a removable cover therefor, as will hereinafter more fully appear.

In the accompanying drawing a method of practicing the invention is shown, in which a milk or cheese vat, A, is supported by uprights, four of which, C, extend above the vat A, and are provided with pulleys D in their upper ends. The uprights C need not extend above the vat A, but in lieu thereof the pulleys D may be secured to the ceiling of the room wherein the vat A is placed. The vat A is surrounded on its sides, ends, and bottom by a water-space formed by placing the box E around the vat A. A funnel or box, F, secured to the end of the box E, communicates with the inlet-pipe G near the bottom of the box E. An overflow-pipe, H, is placed in the opposite end of the box E, about or upon a line with the top of the funnel F. An outlet-pipe or opening, I, is also provided in one end of the box E near its bottom, which is intended to be used for withdrawing the water entirely from the water-space, when desired. The cooling pan or vat K is of tin or other suitable metal, surrounded by a frame, L, to strengthen it, and provided with a perforated pipe, M, which traverses one end of the said vat K, and provided also with one or more ventilators, N, in its bottom, and a discharge-pipe, O, provided with a stop-cock, P, by which the water introduced through the perforated pipe M may be retained in the pan K, or discharged into the funnel F, at pleasure. The tops of the ventilators N are a little higher than the top of the edge of the pan K, so that even were the water to overflow the pan K it could not possibly enter the vat A. Cords Q, provided with weights R, are secured to the pan K, and run over the pulleys D. Hooks S, secured to the sides of the frame L of the pan K, engage with eyes T in the sides of the box E, and serve to hold the pan K upon the vat A as a cover for the same. The milk is placed in the vat A, the pan K secured upon it by the hooks S and eyes T, and the water-connection made with the perforated pipe M, which permits the water to flow over the bottom of the pan K in a thin sheet, when the stop-cock P is left open, and be discharged into the funnel F, thence into the water-space surrounding the vat A. The water-space will in a few minutes be filled up to the overflow-pipe H, after which time it can rise no higher in the said space. If desired, ice may be placed in the pan K, and the drippings permitted to fill the water-space. By either the use of water or ice it will be seen that the upper surface of the milk, as well as the bottom, side, and end surfaces will be cooled; that the cold air will be precipitated from the bottom of the pan K, or drawn down to meet the warm milk; that the milk is protected from impure air; that the ventilators will permit the warm air to be expelled from the vat A; and that the cream will be kept cool as long as the milk, and the whole kept at the proper temperature until every particle of cream has been secured. When it becomes necessary to skim the milk the water may be disconnected, the hooks and eyes disengaged, and the pan K permitted to ascend or be removed to another vat for further use. The bottom of the pan K may be formed by shaping the metal into the double inclined planes $a\ a$, (shown in Fig. 3,) in order that the condensation as it forms upon the under surface of the bottom may seek the lowest points in the bottom before dropping therefrom. The vertices of the double-inclined planes are provided with loops $b$, passed over a rod or rods, $c$, traversing the frame L of the pan K laterally, to support the bottom. Troughs or drip-pipes $d$ are placed beneath the bottom of the pan K a short distance below the lowest points of the bottom of said pan K, to receive the condensed water as it drops from the bottom, and convey it to the outside of the cooler, and thus prevent it from falling into the cream.

Having thus described my invention, what I claim as new is—

1. A cooling pan or vat, provided with a perforated pipe at one end, one or more ventilators at its bottom, and a discharge-pipe regulated by a stop-cock at the other end, as a cover for, and in combination with, a milk or cheese vat, surrounded by a water-space having an inlet-pipe, an overflow-pipe, and a pipe through which the water may be wholly withdrawn from the said water-space, substantially as and for the purposes set forth.

2. In a milk-cooler or cheese-vat, the uprights C, provided with the pulleys D, in combination with the pan K, provided with the cords Q and weights R, substantially as and for the purpose set forth.

ISAAC H. WANZER.

Witnesses:
    E. D. WALDRON,
    W. H. HINTZL.